DISPLAY APPARATUS

Filed March 5, 1963 2 Sheets-Sheet 1

INVENTORS
HAROLD FLEISHER
THOMAS J. HARRIS
EUGENE SHAPIRO

BY George O. Saile
ATTORNEY

United States Patent Office 3,182,574 Patented May 11, 1965

3,182,574
DISPLAY APPARATUS

Harold Fleisher, Thomas J. Harris, and Eugene Shapiro, Poughkeepsie, N.Y., assignors to International Business Machines Corporation, New York, N.Y., a corporation of New York Filed Mar. 5, 1963, Ser. No. 263,002
20 Claims. (Cl. 95—4.5)

This invention relates to a high speed apparatus for visually displaying information in the form of characters, and more particularly, to a character generating matrix and a display system incorporating the matrix which uses electro-optical principles to effect the high speed display of information.

There are many instances where high speed handling of information in the form of electrical signals is required. One such instance is the final step in data processing. Data processing systems have been developed which have the ability to process data at extremely high speeds. The output device for these data processing systems have, in general, lagged in their ability to keep up with the information turned out by the processing machines.

To put the results obtained from a data processing system in a form easily understood hy humans at speeds equivalent to the high speed data processing machines has been a technological problem. The most common procedure for putting the results in a form easily understood by humans has been to print the results. A great variety of printing devices now exists and is used. The printers, with few exceptions, are mechanical in structure. These mechanically operated devices are limited in speed by the difficulty of imparting motion to the relatively heavy mechanical parts. Further, the rapidity of starting and stopping these parts results in wear problems. It is therefore clear that something other than mechanical means must be employed for the rapid handling and visual display of information in the form of electrical signals.

Other techniques for converging data in the form of electrical signals to a visual display have depended upon the display of characters on a cathode ray tube and recording the picture photographically. These developments, while somewhat faster than mechanical means, have led to rather complex specialized cathode ray tubes and character selection circuitry.

A recent development by Albert C. Koelsch, Jr., and Ralph D. De Lano, Jr., disclosed and claimed in U.S. Patent No. 2,909,973, issued October 27, 1959, and assigned to the same assignee as the present invention, utilizes a light source in combination with light polarizers and suitable circuitry to form characters of light areas and dark spots onto a display medium. This development gives a display system that is limited only by the speed of switching the electro-optic light switches. The system, while superior to prior art systems and capable of excellent high speed display, has certain drawbacks. Each character has to be formed by a plurality of selected electro-optic portions which results in a somewhat complex selection circuitry and matrix. In addition, the system for positioning the formed character on the display medium is not very flexible.

It is thus an object of the present invention to provide a high speed display and printing apparatus.

It is another object of the present invention to provide a display apparatus which is capable of high speed character selection and positioning on a display medium wherein there is no limitations as to the character shape.

It is a further object of the present invention to provide a character generating matrix for selecting and forming light beams in the shape of individual characters which has no limitations on character shape and has simple coincident voltage circuitry for character selection.

These and other objects are accomplished in accordance with the broad aspects of the present invention by providing a novel display apparatus and a character generating matrix to be incorporated within the display apparatus. The display apparatus has a means for providing collimated light. The light is applied to a means for selecting and forming incoming collimated light into individual light beams having the cross-sectional shape of desired characters. These character beams are then positioned onto a displaying means. The shaped light beams in the form of individual characters maintain their shape throughout their movement between the selecting and forming means and the display means, because of the collimated nature of the light derived from the light source.

The preferred means for selecting and forming the light is a character generating matrix which utilizes electro-optic materials in its construction. An opaque character mask having transparent areas in the shape of characters is positioned over an electro-optic medium. Plane polarized collimated light is applied to the face of the mask. The character mask passes the collimated light to the medium through its transparent portions in the form of individual character shaped beams. Associated with the electro-optic medium is an electrode system. The electrode system is capable of applying an electric field to the electro-optic medium inducing birefringence in the medium. Light passing through the medium is affected differently depending upon the state the crystal is in. This birefringence, in effect, causes the rotation of the plane of polarization of the plane polarized light transmitted through the electro-optic medium. An analyzer medium positioned on the side of the electro-optic medium opposite to the mask is capable of transmitting only light beams that have had their plane of polarization rotated. In this manner, by proper signal application to the electrode system only the beam of the desired character cross-sectional shape will pass through the analyzer medium.

The foregoing and other objects, features and advantages of the present invention will be apparent from the following more particular description of the preferred embodiments of the invention as illustrated in the accompanying drawings.

Figures 1, 2:
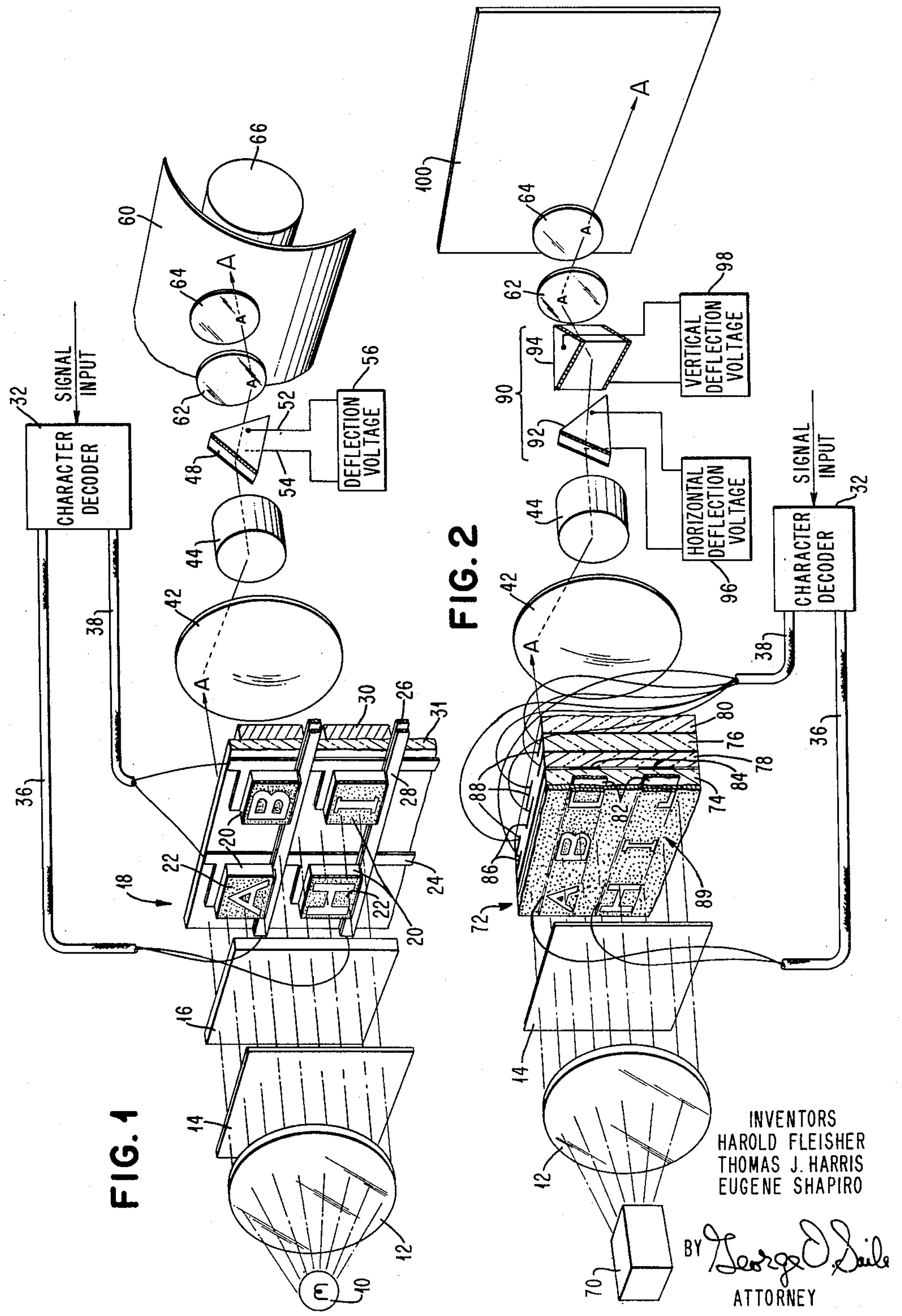
FIGURE 1 is a schematic drawing of a first possible embodiment of the present display apparatus showing the character generating matrix portion of the apparatus in a greatly enlarged and partially sectional form.
FIGURE 2 is a schematic drawing of a second possible embodiment of the display apparatus showing the character generating matrix portion of the apparatus in a greatly enlarged and partially sectional form.

Referring now, more particularly, to FIGURE 1 a first possible embodiment of the high speed display apparatus is shown. The means for providing a collimated light in this embodiment includes a light source 10, which may be a carbon or mercury arc, and a light collimating lens 12. A light polarizer means 14 is positioned in the collimated light path for polarizing the collimated light. The light then passes through filter means 16. The filter means 16 filters out all light with the exception of the light having the desired frequency. The output of the filter means is therefore monochromatic, collimated, polarized light. This specially prepared light is applied to a means for selecting and forming the light into light beams having the cross-sectional shape of individual characters. This selecting and forming means in the FIGURE 1 embodiment takes the form of a character matrix 18.

The character matrix 18 is composed of a body of electro-optically active material or medium 20 which is either a large single transparent crystal or a mosaic having a transparent crystal or electro-optic cell for each transparent character location in the opaque mask 22 as shown in the FIGURE 1 embodiment. The matrix 18 illustrated as having only four characters, but the number of characters could readily be expanded to give 40 x 40 display. The generally opaque character mask 22 which has transparent portions is located between the electro-optic medium 20 and the source of light. The mask 22 forms the light into individual character shaped cross-sectional beams. An electrode system on the electro-optic medium 20 applied an electric field to the medium which has the effect of inducing birefringence in the electro-optic medium.

The electrode system of the character matrix 18 shown in the present embodiment utilizes coordinate selection. There is a plurality of vertical conductors 24 which are parallel to one another, equally spaced and positioned on one side of the electro-optic medium. On the other side of the electro-optic medium 20 and separated from the vertical electrodes 24 by means of an insulating material 26 is a plurality of parallel, equally-spaced horizontal electrodes 28. The horizontal and vertical selection electrodes are perpendicular to each other. This plurality of electrodes effectively divides the electro-optic medium into a regular pattern of active portions, cells or regions.

Each of these active portions, cells or regions is located immediately behind a character shaped transparent opening in the opaque character forming mask 22. An analyzer medium 30 oriented at 90 degrees with respect to the polarizer is mounted on the side of the electro-optic medium opposite to the source of light. A glass backing 31 forms the base of the matrix 18 with the electrode system and electro-optic medium 20 attached to one side and the analyzer medium 30 to the other. The active regions are responsive to voltages applied by the associated electrodes to effectively render the region birefringent and thus rotate the plane of polarization of the light passing through the given region. The analyzer 30 associated with the selected active region transmits only the rotated portion of the incident polarized light. In this manner specific light shaped characters can be selectively transmitted through the electro-optic and the analyzer mediums. The selection time is limited by the switching time of the electro-optic medium which is approximately $10^{-8}$ or $10^{-9}$ seconds.

Appropriate electrical signal voltages are provided to the coordinate electrode system of the character generating matrix 18 from a character decoder 32 through cables 36 and 38. The input signals applied to the character decoder 32 are in the form of coded electric signals or pulses which are decoded by the character decoder 32 to energize, through cables 36 and 38, the desired active region of the electro-optic medium 20. The input signal would vary to indicate the particular region to be activated, such as by changes in frequencies, pulse durations or combinations of the two. Alternately, the input could be composed of multiple conductors with a signal provided on each different conductor for each active region in the electro-optic medium. It is therefore seen that the design of the character decoder 32 is along conventional lines and is within the skill of those familiar with the art.

The product of the character generating matrix is a collimated, monochromatic light beam having the cross-section of an individual character. The character beam is directed by a lens 42 onto a microscope objective lens system 44, which may be of the immersion type, where the character beam diameter is reduced. This reduced size character shaped beam is then applied to a means for positioning the light beam 48.

The positioning means 48 as illustrated in this first embodiment takes the form of an electro-optic ferroelectric crystal which has electrode means 52 and 54 for applying an electric field along the optic axis of the ferroelectric crystal and perpendicular to the direction of the propagation of the light beam through the crystal. The ferroelectric crystal is operated above its Curie temperature to eliminate hysteresis problems. The deflection voltage source 56 applies a varying voltage across the prism shaped crystal 48 which has the effect of changing the refractive index of the crystal. The range of changes in the refractive index result in the deflection of the character shaped light beam to the desired position on the display medium 60, through lens system 62 and 64. The display medium 60 may be, for example, a light or heat sensitive medium. The application of a series of increasing voltages to the crystal 48 causes the writing of characters on the display medium 60 in order across the display. At the end of the line, the first of the series of voltages is again applied and so on.

In this embodiment, deflection is only made from left to right so the display medium which is preferably a substantially flat, light sensitive medium would have to be indexed to the required position for displaying a new line. Such an indexing apparatus is of conventional construction and would take the form of a driving mechanism connected to the roller 66 for moving same after each deflection cycle made by the voltage source 56. Such apparatus is not illustrated in detail in order to avoid unnecessary complexity in the drawing.

FIGURE 2 illustrates a second display apparatus. Parts in this embodiment having the same numbers as in the FIGURE 1 embodiment are identical. The means for providing collimated light in this modification is a laser 70. This light source does not need the light filters of the FIGURE 1 embodiment since the laser is a monochromatic light source. The light is expanded, recollimated and polarized as it passes through, respectively, collimator 12 and polarizer 14 and applied to a character generating matrix 72. In some cases the light from the laser is polarized and polarizer 14 is not needed.

The character generating matrix 72 of this embodiment is of a somewhat less complicated structure and is not susceptible to the crosstalk which tends to arise in coordinate matrices of the type illustrated by character generating matrix 18 in FIGURE 1. The matrix 72 is composed of at least two independent electro-optic mediums 74 and 76, and analyzer mediums 78 and 80 associated with and parallel to each of the electro-optic mediums. An electrode system is associated with each electro-optic medium for selective application of electric fields to the medium. A first array of parallel, equally-spaced selection electrodes 82 are positioned on one side of the first electro-optic medium 74. A second array of parallel, equally-spaced selection electrodes 84 are positioned on the other side of the first medium directly opposite the first array of electrodes. The electrodes in the first and second arrays are positioned so that there is an electrode from the first and second arrays directly opposite to one another across the electro-optic medium 74. The second electro-optic medium 76 has third and fourth arrays of parallel, equally-spaced selection electrodes 86 and 88, respectively, positioned on opposite sides of its body. The lengths of the first and second, and third and fourth arrays of electrodes are at right angles to each other. This arrangement divides the character generating matrix into a plurality of active portions or regions.

A character mask 89 of the type utilized in the FIGURE 1 embodiment is positioned on the side of the first electro-optic medium 74 adjacent to the collimated, monochromatic, polarized light source. The mask 89 in this embodiment completely covers the face of the matrix 72 to prevent the leakage of unwanted light into the system. Each active region of the electro-optic mediums has associated with it a transparent area in the form of a character on the opaque character mask 89. A character decoder 32 of the type of the first embodiment applies appropriate electric signal voltages to the coordinate electrode arrangement through cables 36 and 38 to pass the selected character.

The output of the character matrix 72 is a polarized, collimated, monochromatic light beam having a cross-section of an individual character. The light beam is applied through lens 42 to a microscopic objective lens system 44 where the beam diameter is reduced. The reduced diameter character containing beam is then applied to a positioning means 90. The positioning means 90 in this embodiment incorporates a second prism shaped ferroelectric crystal 94 which is positioned with its optic axis at right angles to that of the first prism 92. Horizontal and vertical deflection voltage sources 96 and 98, respectively, apply voltages across the ferroelectric crystals 92 and 94. The applied voltages change the refractive index of the respective crystal in such a way as to precisely position the character in two dimensions on the display medium 100. If the display medium is a light sensitive medium, it must be replaced with another sheet by means of an indexing means (not shown). The indexing means could, however, be a roller or drum type as schematically indicated in FIGURE 1. This two dimensional deflection has the advantage of requiring a somewhat slower mechanical indexing mechanism than the one dimensional deflection embodiment.

Figure 3:
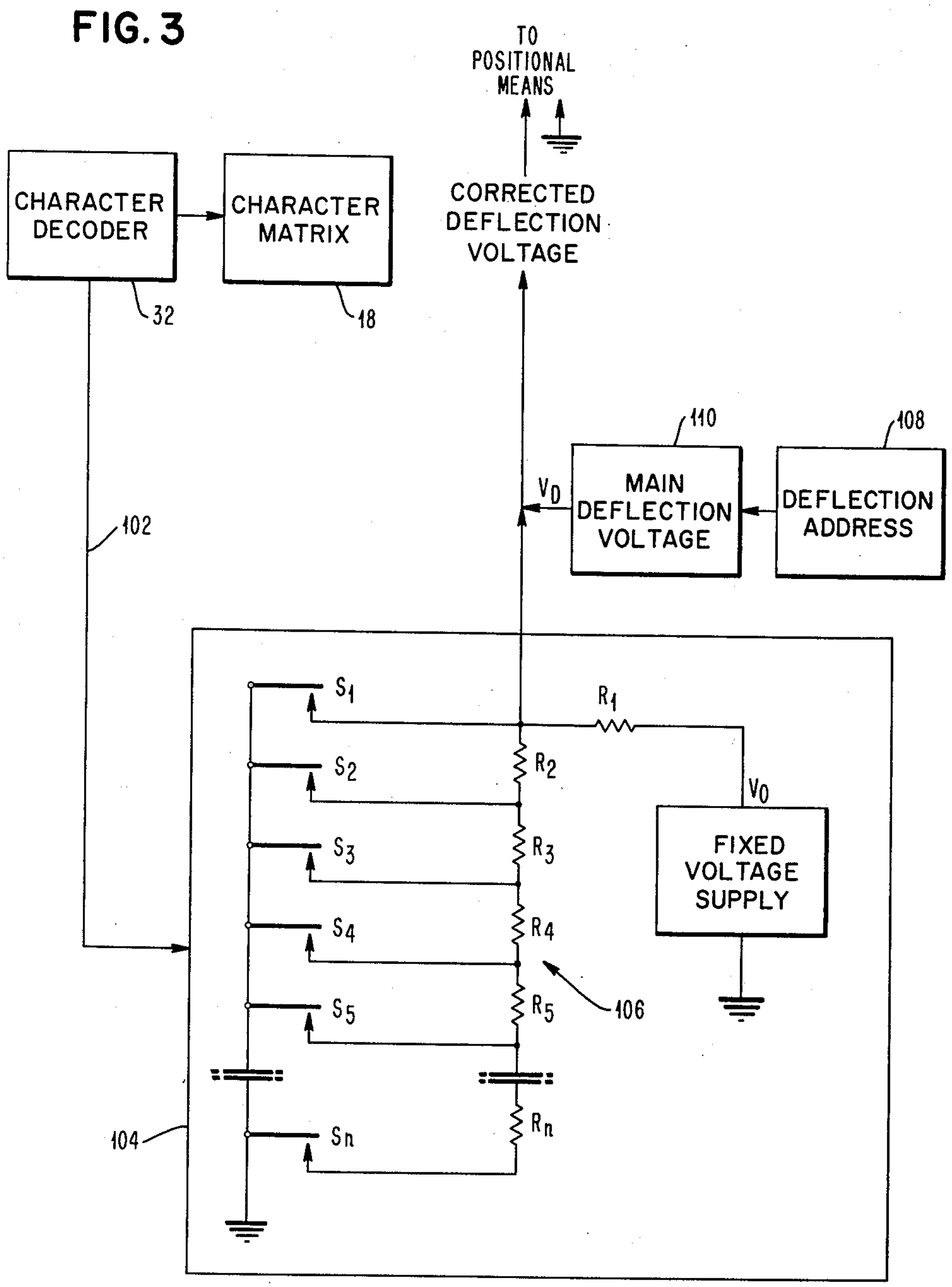
FIGURE 3 is a circuit drawing of one possible character position correction circuit to be applied to the electro-optic deflection device of the FIGURE 1 or FIGURE 2 embodiment.

FIGURE 3 shows a schematic drawing of circuitry which will correct the positioning means 48 for the spacial separation of the characters in the character generating matrix. One dimensional deflection requires a one dimensional matrix. The characters are positioned on the display medium by applying the correct voltage to an electro-optic positioning device, such as positioning means 48 of FIGURE 1. It is necessary to modify the light beam deflection voltage for deflecting different characters of the matrix to exactly the same position on the screen, because of the spacial separation of the characters in the matrix 18. One possible method of introducing correction voltage increments to nullify the spacial character separation is shown by this circuitry. When a character in a given row is selected a signal pulse is sent from the character decoder 32 through wire 102 to the positioning correction voltage device 104. The signal pulse operates a switch within the positioning correction device 104 corresponding to the row selected. The operation of the switch corresponding to the row selected will ground the voltage divider network 106 and a (+ or −) predetermined voltage increment is added to the main deflection voltage $V_D$ to give the corrected deflection voltage to be applied to the positioning means. The main deflection voltage $V_D$ is provided by the voltage source 110, which gives the desired voltage magnitude, at the instruction of a continuous programmed deflection address device 108.

In operation of the FIGURE 1 embodiment, a monochromatic, collimated, polarized light is constantly applied to the opaque character mask side of the character matrix 18. The light passes through the transparent character portions of the opaque mask 22, the electro-optic medium 20 and glass backing 31. The cooperative action of the polarizer 14 and the analyzer 30, as is well known, prevents the transmission of light through the analyzer 30. An electrical signal is applied to the character decoder 32 indicating the selection of letter "A" to be displayed or printed. The line A, B, etc. is activated by applying a half-select voltage to the horizontal electrode 28 associated with this particular line through cable 36 in a magnitude insufficient to cause switching of the active electro-optic portions behind the line of characters. A similar half-select voltage is applied through cable 38 to the vertical electrode 24 associated with the row A, H, etc. of a magnitude insufficient to cause the switching of the active electro-optic portions behind the row of characters. The joint application of the two applied voltages produces an electrical field in the area of the electro-optic medium 20 behind the "A" character in the opaque mask 22. The field is sufficient in magnitude to render this portion of the electro-optic crystal birefringent while having little effect on other crystalline portions of the electro-optic medium. The birefringent crystal behind the character "A" in the character mask causes the rotation of the plane of polarization of the light transmitted through the crystal. The analyzer medium 30 associated with the seletced electro-optic crystal region now transmits the rotated portion of the incident light. The cross-section of the beam passing through the analyzer is the shape of a letter "A." The beam passes through the lens 42 and is reduced in size by the microscope objective lens 44. The letter "A" shaped light beam is deflected by the positioning means 48 onto the light or heat sensitive display medium 60 and printed thereon. If the FIGURE 3 deflection circuitry is used to provide the "A" corrected deflection voltage to the positioning means, an electric signal corresponding to the selection of row A, H, etc. is applied to the selection device 104 and causes the closing of the switch $S_1$. The deflection address device 108 in combination with the main deflection voltage source 110 provides a continuing series of voltages each of an increasing magnitude until the series has ended, then the series is begun anew, repeated and so on. The closure of the switch $S_1$ grounds the voltage divider network 106 and adds a predetermined voltage increment, which in this particular case would be zero, to the voltage $V_D$ derived from the combination of the deflection address and the main deflection voltage device. The corrected voltage is then applied to the positioning means 48.

The embodiment of FIGURE 2 operates in a similar manner to the FIGURE 1 embodiment. The collimated, polarized monochromatic light is uniformly applied to the character mask face of the character matrix 72. Upon selection of a character "A," as identified by the signal input to the character decoder 32, lateral fields between electrodes 82 and 84 in line A, B, C, etc. and electrodes 86 and 88 of row A, H, etc. are applied. The lateral field across line A, B, C, etc. allows the passage of that entire line in the form of light beams having the cross-section of the characters through the first analyzer 78 and the second electro-optic medium. This line of character beams is stopped by the second analyzer medium 80 with the exception of the letter "A" light beam which passes out of the character generating matrix 72. The "A" shaped beam is allowed to pass because the electro-optic medium 76 is made birefringent only in the region of the row A, H, etc. by the field generated across electrodes 86 and 88. The light beam passes through the lens 42, the microscope objective 44 and is deflected by the positioning means 90. Each of the deflection means 92 and 94 of the positioning means 90 operates in an identical fashion to the deflection means 48 of the first embodiment. The two means operate, however, in combination to allow a two dimensional positioning onto the display medium 100. The FIGURE 3 spacial correction circuitry would, of course, be usable with this form of positioning means. Such a correction circuit would be required for both the horizontal and vertical deflection voltage means for spacial correction in both the rows and columns of the character matrix.

The fabrication of the character matrices may be accomplished by conventional techniques using commercially available materials. The electro-optic mediums are preferably composed of barium titanate ($BaTiO_3$) crystals. However, other examples of electro-optic crystalline materials which may be used are mixtures of titanate of barium and strontium, or guanidine aluminum sulfate hexahydrate, ADP, and KDP crystals. The electrodes may be applied to the electro-optic crystals by conventional coating techniques, such as silk screening, in the form of a silver or platinum paste onto the crystal surface followed by sintering at appropriate temperatures or by vacuum evaporation. The opaque character mask may be fabricated by applying a coating of any opaque material, such as paint, onto a transparent material, such as glass or a thermoplastic, to give the desired transparent character pattern.

The ferroelectric crystal used in the positioning means is preferably composed of a single crystal of barium titanate. The crystal may be grown, for example, by the method of J. P. Remenika described in the article "A Method for Growing Barium Titanate Single Crystals," Journal of American Chemical Society, 76, page 940 (1950). The electrical connections are made of preferably gold or platinum electrodes which have been applied to the opposite edges by conventional coating techniques. The crystal is both fabricated and operated above its 120° C. Curie temperature.

The perferred light source is an optical maser or laser because of its highly coherent and monochromatic radiation characteristics. There is an ever increasing number of continuously operating lasers on the market. Examples of continuously operating lasers are in the solid state, calcium fluoride doped with dysprosium, calcium tungstate doped with trivalent neodymium and ruby crystals; the gaseous types utilizing gases such as helium, neon, argon, krypton and xenon; and the semiconductor lasers such as the gallium arsenide diode. The choice of the particular continuous wave (CW) laser depends largely upon the frequency or color of the light desired and energy content of the beam required. The calcium fluoride crystal doped with divalent dysprosium is a good light source since its output is greater than 0.3 watt. An even more suitable coherent, collimated light is the gallium arsenide diode because of its excellent efficiency and output energy available. The particular details of the laser light source structures and particular pumping or power sources are not given since these light sources are known in the art and discussion in detail would needlessly add to the description of the present invention.

The optical filter 16 of the FIGURE 1 embodiment can be a tunable narrowband filter to thereby give the system the ability to have a display character output of various frequencies or colors. One filter of this type that has proved effective is a polarization interference filter which can have a pass band as small as a fraction of an angstrom. The pass band can be shifted to any desired region of the spectrum. The transmission band is formed by the superposition of the polarized channel spectra, produced by *x*-cut plates of quartz or other birefringent media placed between parallel polarizers. The tuning is accomplished by changing the retardation of successive elements so that transmission maxima in various channel spectra coincide at the desired wavelength. The retardation change can be made mechanically, for example, by stretching supplemental plastic sheets in series with the filter elements or can be made electrically by using Kerr cells or crystals with high electro-optic coefficients.

The invention is not intended to be limited to the particular positioning means. Other light deflection structures are usable which have the ability to position the character shaped beam onto the display medium without substantially affecting the coherence of the beam. A crystalline medium is not required. Controlled deflection of light is possible using a liquid as the deflection medium with appropriately positioned electrodes within the liquid.

The invention thus provides a character generating matrix and a display system incorporating the matrix. The conversion of electrical signals to visual representations utilizing the present invention can be made in millimicroseconds. Printing can therefore be accomplished on the heat or light sensitive medium at speeds comparative to that of the remaining portions of the data processing system. The speed at which the display apparatus is operated is limited only by the sensitivity of the light or heat sensitive medium and the display medium indexing mechanism used to synchronize with the operation of the electro-optic portions of the display system.

While this invention has been particularly shown and described with reference to preferred embodiments thereof, it will be understood by those skilled in the art that the foregoing and other changes in form and details may be made therein without departing from the spirit and scope of the invention.

What is claimed is:

1. A display apparatus comprising:
a source of monochromatic, collimated light;
a plurality of electro-optic cells;
a polarizer for polarizing light mounted between said electro-optic medium and said source of light so that light from said source propagates through said polarizer to and through said medium;
an electrode system associated with said electro-optic cells for applying an electric field to a given cell at one point in time that induces birefringence in said cell thereby effecting the rotation of the plane of polarization of polarized light transmitted through said cell;
a generally opaque character mask having transparent portions in the shape of characters;
each of said transparent portions being aligned with one of said cells to form the light passing through the cells into individual character shaped beams; and
an analyzer medium positioned on the side of the light output electro-optic medium for only transmitting light beams that have had their plane of polarization rotated; and
a display medium for displaying the said beams which have had their plane of polarization rotated.

2. A display apparatus comprising:
a source of monochromatic, collimated light;
an electro-optic medium;
a polarizer for polarizing light mounted between said electro-optic medium and said source of light so that light from said source propagates through said polarizer to and through said medium;
a generally opaque character mask having transparent portions positioned over said electro-optic medium for passing light to said medium in the form of individual character shaped beams;
an electrode system on said electro-optic medium which effectively divides the said medium into regions for selectively applying an electric field to a given region of said medium at one point in time that induces birefringence in said region thereby effecting the rotation of the plane of polarization of polarized light transmitted through said region;
each of said regions having applied to it one of said shaped light beams;
an analyzer medium positioned on the side of the electro-optic medium opposite to the said mask for only transmitting light beams that have had their plane of polarization rotated;
a display medium; and
means for deflecting said light beams which pass through said analyzer medium to the desired position on said display medium.

3. A display apparatus comprising:
a source of monochromatic, collimated light;
a body of electro-optically active material;
a polarizer for polarizing light mounted between said body of electro-optically active material and said source of light so that light from said source propagates through said polarizer to and through said body;
an analyzer mounted on the side of said body opposite to said source of light;
at least one character mask positioned over said body for forming said light from said source into a plurality of light beams of the desired shape;
a plurality of pairs of electrodes associated with a regular pattern of active portions of said body;
each of said active portions having applied to it one of said light beams;
said active portions being responsive to voltages applied by said associated pairs of electrodes to effectively change the angle of polarization of light passing therethrough to thereby change the light transmission through the combination of said polarizer, active portions of said body and analyzer;
a display medium;
means for concurrently energizing selected electrode pairs to pass the desired light beam shape through said analyzer; and
means for deflecting said light beams which pass through said analyzer medium to the desired position on said display medium.

4. A display apparatus comprising:
a source of monochromatic, collimated light;
a body of electro-optically active material;
a polarizer for polarizing light mounted between said body of electro-optically active material and said source of light so that light from said source propagates through said polarizer to and through said body;
an analyzer mounted on the side of said body opposite to said source of light;
at least one character mask positioned over said body for forming said light from said source into a plurality of light beams of the desired shape;
a plurality of pairs of electrodes associated with a regular pattern of active portions of said body;
each of said active portions having applied to it one of said light beams;
said active portions being responsive to voltages applied by said associated pairs of electrodes to effectively change the angle of polarization of light passing therethrough to thereby change the light transmission through the combination of said polarizer, active portions of said body and analyzer;
a display medium;
means for concurrently energizing selected electrode pairs to pass the desired light beam shape through said analyzer;
a ferroelectric crystal; and
means for applying an electric field along an axis of said crystal and perpendicular to the direction of the propagation of light which passes through said analyzer medium through the said crystal for effecting a deflection of said light to the desired position on said display medium.

5. A display apparatus comprising:
a source of monochromatic, collimated light;
a body of electro-optically active material;
a polarizer for polarizing light mounted between said body of electro-optically active material and said source of light so that light from said source propagates through said polarizer and through said body;
an analyzer mounted on the side of said body opposite to said source of light;
at least one character mask positioned over said body for forming said light from said source into a plurality of light beams of the desired shape;
a plurality of pairs of electrodes associated with a regular pattern of active portions of said body;
each of said active portions having applied to it one of said light beams;
said active portions being responsive to voltages applied by said associated pairs of electrodes to effectively change the angle of polarization of light passing therethrough to thereby change the light transmission through the combination of said polarizer, active portions of said body and analyzer;
a display medium;
means for concurrently energizing selected electrode pairs to pass the desired light beam shape through said analyzer;
a ferroelectric crystal; and
means for applying an electric field along an axis of said crystal and perpendicular to the direction of the propagation of light which passes through said analyzer through the said crystal for effecting a deflection of said light to the desired position on said display medium;
said applying means including a means for modifying the electric field depending upon the spacial separation of the characters in said character mask for assuring the deflection of any given character shaped light beam to the desired location on said display medium.

6. A display apparatus comprising:
a source of monochromatic, collimated light;
at least two independent bodies of electro-optically active material;
a polarizer for polarizing light mounted between at least the first of said bodies of electro-optically active material and said source of light so that light from said source propagates through said polarizer to and through said bodies;
an opaque character mask positioned over at least the first of said electro-optic bodies for passing light to said first electro-optic body in the form of individual characters;
an electrode system associated with each of said electro-optic bodies for applying an electric field to each of said bodies that induces birefringence in each of said bodies thereby effecting the rotation of the plane of polarization of polarized light transmitted through each of said bodies;
an analyzer medium associated with and parallel to each of said electro-optic bodies and positioned on the side opposite from the source of said light;
said electro-optic bodies, associated electrode systems and said analyzer being arranged so that said light could pass successively through them;
a display medium;
means for concurrently energizing selected electrode pairs to pass the desired light beam shape through said analyzers; and
means for deflecting said light beams which pass through the last said analyzer medium to the desired position on said display medium.

7. A character generating matrix for selecting and forming light beams in the shape of individual characters comprising:
a plurality of electro-optic cells;
an electrode system associated with said electro-optic cells for applying an electric field to a given cell at one point in time that induces birefringement in said cell thereby effecting the rotation of the plane of polarization of polarized light transmitted through said cell;
a generally opaque character mask having transparent portions in the shape of characters;
each of said transparent portions being aligned with one of said cells to form the light passing through the cells into individual character shaped beams; and
an analyzer medium positioned on the side of the light output electro-optic medium for only transmitting light beams that have had their plane of polarization rotated.

8. A character generating matrix for selecting and forming light beams in the shape of individual characters comprising:
an electro-optic birefringent medium;
a first array of parallel, equally-spaced selection electrodes positioned on one side of said first electro-optic birefringent medium;

a second array of parallel, equally-spaced selection electrodes positioned on the side of the said first medium opposite to said first array of electrodes;

the electrodes in said first and second arrays being positioned so that there is an electrode from the first and second arrays directly opposite to one another across said electro-optic medium;

a first analyzer medium which only transmits light which has had its plane of polarization rotated by said electro-optic medium; and a generally opaque character mask having transparent portions positioned over at least one of said electrodes in said first array for passing light to said electro-optic medium in the form of an individual shaped character.

9. A character generating matrix for selecting and forming light beams in the shape of individual characters comprising:

an electro-optic medium;

a generally opaque character mask having transparent portions positioned over said electro-optic medium for passing light to said medium in the form of an individual character shaped beam;

an electrode system on said electro-optic medium which effectively divides the said medium into regions for applying an electric field to a given region of said medium at one point in time that induces birefringence in said region thereby effecting the rotation of the plane of polarization of polarized light transmitted through said region; and an analyzer medium positioned on the side of the electro-optic medium opposite to the said mask for only transmitting light beams that have had their plane of polarization rotated.

10. A character generating matrix for selecting and forming light beams in the shape of individual characters comprising:

an electro-optic medium;

a generally opaque character mask having transparent portions positioned over said electro-optic medium for passing light to said medium in the form of an individual character shaped beam;

an electrode system associated with said electro-optic medium for the application of electric fields to said medium;

the said electrode system being so associated with said electro-optic medium as to divide the said medium into regions which may independently have an electric field applied thereto for causing the switching of the optic axis of an independent region between first and second stable states thereby effecting the rotation of the plane of polarization of polarized light transmitted through the said independent region; and an analyzer medium positioned on the side of the electro-optic medium opposite to the said mask for only transmitting light beams that have their plane of polarization rotated.

11. A character generating matrix for selecting and forming light beams in the shape of individual characters from a monochromatic, collimated light comprising:

at least two independent electro-optic mediums;

a generally opaque character mask having transparent portions positioned over at least the first of said electro-optic mediums for passing light to said first electro-optic medium in the form of individual characters;

an electrode system associated with each said electro-optic medium and which effectively divides the said medium into regions for applying an electric field to given regions at one point in time that induces birefringence in said regions thereby effecting the rotation of the plane of polarization of polarized light transmitted through said regions; and an analyzer medium associated with and parallel to each of said electro-optic mediums and positioned on the side opposite from the source of said light;

said electro-optic mediums, associated electrode systems and said analyzers being arranged so that said light could pass successively through them.

12. A character generating matrix for selecting and forming light beams in the shape of individual characters from a monochromatic, collimated light comprising:

at least two independent electro-optic mediums;

a generally opaque character mask having transparent portions positioned over at least the first of said electro-optic mediums for passing light to said first electro-optic medium in the form of an individual character;

an electrode system associated with said electro-optic medium for the application of electric fields to said medium;

each of said electrode systems being associated with each of said electro-optic mediums in a manner that said each medium is divided into regions which may independently have an electric field applied thereto for causing the switching of the optic axis of an independent region between first and second stable states thereby effecting the rotation of the plane of polarization of polarized light transmitted through the said independent region when said region is in its second stable state; and an analyzer medium associated with and parallel to each of said electro-optic mediums and positioned on the side opposite from the source of said light;

said electro-optic means, associated electrodes systems and said analyzers being so arranged that said light could pass successively through them.

13. A character generating matrix for selecting and forming light beams in the shape of individual characters comprising:

a first electro-optic birefringent medium;

a first array of parallel, equally-spaced selection electrodes positioned on one side of said first electro-optic birefringent medium;

a second array of parallel, equally-spaced selection electrodes positioned on the side of the said first medium opposite to said first array of electrodes;

the electrodes in said first and second arrays are positioned so that there is an electrode from the first and second arrays directly opposite to one another across said first medium;

a first analyzer medium which only transmits light which has had its plane of polarization rotated by said first birefringent medium;

a generally opaque character mask having transparent portions positioned over at least one of said electrodes in said first array for passing light to said first electro-optic medium in the form of an individual shaped character;

a second electro-optic birefringent medium;

a third array of parallel, equally-spaced selection electrodes positioned on one side of said second electro-optic medium;

a fourth array of parallel, equally-spaced selection electrodes positioned on the side of the said second medium opposite to said third array of electrodes;

the electrodes in said third and fourth arrays are positioned so that there is an electrode from the third and fourth arrays directly opposite to one another across said second medium; and so that the electrodes of the first and second arrays are perpendicular to the electrodes of the third and fourth arrays;

said transparent portions of said mask being located at points on the mask where the perpendicular arrays of electrodes appear to cross one another as viewed from the position of the source of light; and a second analyzer medium which will only transmit light which has had its plane of polarization rotated by said second birefringent medium.

14. A display apparatus comprising:
a source of monochromatic, collimated light;
at least two independent bodies of electro-optically active material;
a polarizer for polarizing light mounted between at least the first of said bodies of electro-optically active material and said source of light so that light from said source propagates through said polarizer to and through said bodies;
an opaque character mask positioned over at least the first of said electro-optic bodies for passing light to said first electro-optic body in the form of individual characters;
an electrode system, associated with each of said electro-optic bodies and which effectively divides the said medium into regions, for applying an electric field to given regions at one point in time that induces birefringence in said regions thereby effecting the rotation of the plane of polarization of polarized light transmitted through said regions;
each of said regions having applied to it one of said shaped light beams;
an analyzer medium associated with and parallel to each of said electro-optic bodies and positioned on the side opposite from the source of said light;
said electro-optic bodies, associated electrode systems and said analyzers being arranged so that said light could pass successively through them;
a display medium;
means for concurrently energizing selected electrode pairs to pass the desired light beam shape through said analyzers; and
means for deflecting said light beams which pass through the last said analyzer medium to the desired position on said display medium.

15. A display apparatus comprising:
a source of monochromatic, collimated light;
at least two independent bodies of electro-optically active material;
a polarizer for polarizing light mounted between at least the first said bodies of electro-optically active material and said source of light so that light from said source propagates through said polarizer to and through said bodies;
an opaque character mask positioned over at least the first of said electro-optic bodies for passing light to said first electro-optic body in the form of individual characters;
an electrode system, associated with each of said electro-optic bodies and which effectively divides the said medium into regions, for applying an electric field to given regions at one point in time that induces birefringence in said regions thereby effecting the rotation of the plane of polarization of polarized light transmitted through said regions;
each of said regions having applied to it one of said shaped light beams;
an analyzer medium associated with and parallel to each of said electro-optic bodies and positioned on the side opposite from the source of said light;
said electro-optic bodies, associated electrode systems and said analyzers being arranged so that said light could pass successively through them;
a display medium;
means for concurrently energizing selected electrode pairs to pass the desired light beam shape through said analyzers;
a ferroelectric crystal; and
means for applying an electric field along an axis of said crystal and perpendicular to the direction of the propagation of light which passes through said analyzer medium through the said crystal for effecting a deflection of said light to the desired position on said display medium.

16. A display apparatus comprising:
a source of monochromatic, collimated light;
at least two independent bodies of electro-optically active material;
a polarizer for polarizing light mounted between at least the first of said bodies of electro-optically active material and said source of light so that light from said source propagates through said polarizer to and through said bodies;
an opaque character mask positioned over at least the first of said electro-optic bodies for passing light to said first electro-optic body in the form of individual characters;
an electrode system, associated with each of said electro-optic bodies and which effectively divides the said medium into regions for applying an electric field to given regions at one point in time that induces birefringence in said regions thereby effecting the rotation of the plane of polarization of polarized light transmitted through said regions;
each of said regions having applied to it one of said shaped light beams;
an analyzer medium associated with and parallel to each of said electro-optic bodies and positioned on the side opposite from the source of said light;
said electro-optic bodies, associated electrode systems and said analyzers being arranged so that said light could pass successively through them;
a display medium;
means for concurrently energizing selected electrode pairs to pass the desired light beam shape through said analyzers;
a ferroelectric crystal; and
means for applying an electric field along an axis of said crystal and perpendicular to the direction of the propagation of light which passes through said analyzer through the said crystal for effecting a deflection of said light in each of two directions to the desired position on said display medium;
said applying means including a means for modifying the electric field depending upon the spacial separation of the characters in said character mask for assuring the deflection of any given character shaped light beam to the desired location on said display medium.

17. A display apparatus comprising:
a source of monochromatic, collimated light;
an electro-optic medium;
a polarizer for polarizing light mounted between said electro-optic medium and said source of light so that light from said source propagates through said polarizer to and through said medium;
a generally opaque character mask having transparent portions positioned over said electro-optic medium for passing light to said medium in the form of an individual character shaped beam;
an electrode system associated with said electro-optic medium for the application of electric fields to said medium;
the said electrode system being so associated with said electro-optic medium as to divide the said medium into regions which may independently have an electric field applied thereto for causing the switching of the optic axis of an independent region between first and second stable states thereby effecting the rotation of the plane of polarization of polarized light transmitted through the said independent region;
an analyzer medium positioned on the side of the electro-optic medium opposite to the said mask for transmitting only light beams that have their plane of polarization rotated;
a display medium; and means for deflecting said shaped light beam which passes through said analyzer medium to the desired position on said display medium.

18. A display apparatus comprising:
a source of monochromatic, collimated light;
an electro-optic medium;
a polarizer for polarizing light mounted between said electro-optic medium and said source of light so that light from said source propagates through said polarizer to and through said medium;
a generally opaque character mask having transparent portions positioned over said electro-optic medium for passing light to said medium in the form of individual character shaped beams;
an electrode system on said electro-optic medium which effectively divides the said medium into regions for selectively applying an electric field to a given region of said medium at one point in time that induces birefringence in said region thereby effecting the rotation of the plane of polarization of polarized light transmitted through said region;
each of said regions having applied to it one of said shaped light beams;
an analyzer medium positioned on the side of the electro-optic medium opposite to the said mask for only transmitting light beams that have had their plane of polarization rotated;
a display medium;
a ferroelectric crystal; and
means for applying an electric field along an axis of said crystal and perpendicular to the direction of the propagation of light which passes through said analyzer medium through the said crystal for effecting a deflection of said light to the desired position on said display medium.

19. A display apparatus comprising:
a source of monochromatic, collimated light;
an electro-optic medium;
a polarizer for polarizing light mounted between said electro-optic medium and said source of light so that light from said source propagates through said polarizer to and through said medium;
a generally opaque character mask having transparent portions positioned over said electro-optic medium for passing light to said medium in the form of an individual character shaped beam;
an electrode system associated with said electro-optic medium for the application of electric fields to said medium;
the said electrode system being so associated with said electro-optic medium as to divide the said medium into regions which may independently have an electric field applied thereto for causing the switching of the optic axis of an independent region between first and second stable states thereby effecting the rotation of the plane of polarization of polarized light transmitted through the said independent region;
an analyzer medium positioned on the side of the electro-optic medium opposite to the said mask for only transmitting light beams that have their plane of polarization rotated;
a display medium;
a ferroelectric crystal; and
means for applying an electric field along an axis of said crystal and perpendicular to the direction of the propagation of light which passes through said analyzer through the said crystal for effecting a deflection of said light to the desired position on said display medium;
said applying means including a means for modifying the electric field depending upon the spacial separation of the characters in said character mask for assuring the deflection of any given character shaped light beam to the desired location on said display medium.

20. A display apparatus comprising:
a source of monochromatic, collimated light;
an electro-optic medium;
a polarizer for polarizing light mounted between said electro-optic medium and said source of light so that light from said source propagates through said polarizer to and through said medium;
a first array of parallel, equally-spaced selection electrodes positioned on one side of said first electro-optic birefringent medium;
a second array of parallel, equally-spaced selection electrodes positioned on the side of the said first medium opposite to said first array of electrodes;
the electrodes in said first and second arrays are positioned so that there is an electrode from the first and second arrays directly opposite to one another across said electro-optic medium;
a first analyzer medium which only transmits light which has had its plane of polarization rotated by said electro-optic medium;
a ferroelectric crystal;
means for applying an electric field along an axis of said crystal and perpendicular to the direction of the propagation of light which passes through said analyzer through the said crystal for effecting a deflection of said light to the desired position on said display medium; and
said applying means including a means for modifying the electric field depending upon the spacial separation of the characters in said character mask for assuring the deflection of any given character shaped light beam to the desired location on said display medium.

References Cited by the Examiner

UNITED STATES PATENTS

| | | | |
|---|---|---|---|
| 581,815 | 5/97 | Eaton | 178—6.7 X |
| 1,923,891 | 8/33 | Skaupy | 88—61 X |
| 2,379,880 | 7/45 | Burgess | 178—15 |
| 3,067,413 | 12/62 | Fischle | 340—334 |

NORTON ANSHER, *Primary Examiner.*

JOHN M. HORAN, *Examiner.*